United States Patent [19]

Knapp

[11] Patent Number: 4,858,567

[45] Date of Patent: Aug. 22, 1989

[54] INTERNAL COMBUSTION ENGINE

[75] Inventor: Heinrich Knapp, Leonberg, Fed. Rep. of Germany

[73] Assignee: Robert Bosch GmbH, Stuttgart, Fed. Rep. of Germany

[21] Appl. No.: 129,380

[22] Filed: Nov. 24, 1987

Related U.S. Application Data

[63] Continuation of Ser. No. 877,939, Jun. 24, 1986, abandoned.

[30] Foreign Application Priority Data

Jun. 27, 1985 [DE] Fed. Rep. of Germany ....... 3522991

[51] Int. Cl.$^4$ ............................................. F02M 39/00
[52] U.S. Cl. .............................. 123/52 M; 123/188 M; 123/276
[58] Field of Search .......... 123/52 M, 52 MB, 188 M, 123/279, 276, 193 P, 90.15; 137/847, 855, 857

[56] References Cited

U.S. PATENT DOCUMENTS

| | | | |
|---|---|---|---|
| 2,154,880 | 4/1939 | Twigg | 137/857 |
| 3,797,466 | 3/1974 | Nambu | 123/279 |
| 3,972,314 | 8/1976 | DuPont et al. | 123/52 M |
| 3,978,829 | 9/1976 | Takahashi et al. | 123/90.15 |
| 4,015,577 | 4/1977 | Elsbett et al. | 123/188 M |
| 4,207,854 | 6/1980 | Alford et al. | 123/188 M |
| 4,227,505 | 10/1980 | Larson et al. | 123/90.15 |
| 4,240,387 | 12/1980 | Motosugi et al. | 123/52 MB |
| 4,271,795 | 6/1981 | Nakagawa et al. | 123/188 M |
| 4,320,725 | 3/1982 | Rychlik et al. | 123/188 M |
| 4,465,034 | 8/1984 | Tsutsumi | 123/52 M |
| 4,467,749 | 8/1984 | Maeda | 123/188 M |
| 4,473,040 | 9/1984 | Shibata et al. | 123/188 M |
| 4,586,469 | 5/1986 | Okumura et al. | 123/188 M |
| 4,617,897 | 10/1986 | Sasaki et al. | 123/188 M |
| 4,700,684 | 10/1987 | Pischinger et al. | 123/90.11 |

FOREIGN PATENT DOCUMENTS 0088953 7/1981 Japan ............................... 123/52 M Primary Examiner—David A. Okonsky
Attorney, Agent, or Firm—Edwin E. Greigg

[57] ABSTRACT

An internal combustion engine is proposed which operates on a lean fuel-air mixture. The engine comprises an inlet channel which leads to the cylinder with a piston and which opens into the cylinder via an inlet valve. A flap element pivotably mounted about a pivot axis which is seated on one side is disposed in a section of the inlet channel; said section having a rectangular cross-section. The flap also has a rectangular cross-section and is used to produce a rotating flow in the cylinder in operating states other than full load. Displacement of the flap can be effected against the force of a spring by the suction air or by a servomotor controlled by an electronic control device as a function of the operating parameters of the internal combustion engine such as rpm flap position and temperature. The fuel is injected by means of an injection valve downstream of the flap such that when the inlet valve is open there will be formed in a depression in the piston firstly a horizontal layer of a rich fuel-air mixture which can be ignited by a spark plug and above it leaner mixture layers.

20 Claims, 1 Drawing Sheet

INTERNAL COMBUSTION ENGINE

This is a continuation of copending application Ser. No. 877,939 filed June 24, 1986, now abandoned.

BACKGROUND OF THE INVENTION

The present invention relates to an internal combustion engine as described hereinafter. Toyota already has a so-called lean engine in which the fuel-air mixture flowing into the cylinder is set into a twisting movement by means of a twisting member. In this engine, fuel injection takes place upstream of the twisting member in a timely manner. This is a very costly proposition.

OBJECT AND SUMMARY OF THE INVENTION

The advantage of the internal combustion engine according to the invention comprising the features revealed herein over the Toyota engine is that it proposes a so-called lean engine concept using simple means. The result hereby obtained is that there is produced in the cylinder a mixture layering which comprises a rich ignitable layer at the piston and lean layers in the proximity of the inlet valve.

The new features of this invention provide for advantageous developments of and improvements to the internal combustion engine described in this application. It is especially advantageous for the twist flap to be actuatable by the suction air such that at a low rpm it still partially follows the suction surges but at a higher rpm it more or less stays quiescent. As a result, return currents are throttled, thereby improving idling stability.

A further advantage of this invention comprises an arrangement to actuate the twist flap by means of a servomotor as a function of the operating parameters of the internal combustion engine, more specifically, this is achieved by using the rpm of the engine as the control parameter.

A still further advantage comprises providing the piston opposite the inlet valve with a depression into which a spark plug is adapted to project, thereby enabling the rich ignitable fuel-air mixture near to the piston to be ignited by the spark plug, said mixture having been formed horizontally in the cylinder as a result of the twist effect and remaining there during compression.

The invention will be better understood and further objects and advantages thereof will become more apparent from the ensuing detailed description of a preferred embodiment taken in conjunction with the drawings.

BRIEF DESCRIPTION OF THE DRAWINGS

The drawing shows a simplified embodiment of the invention which will be described in more detail hereinafter.

DESCRIPTION OF THE PREFERRED EMBODIMENT

Figure 1:
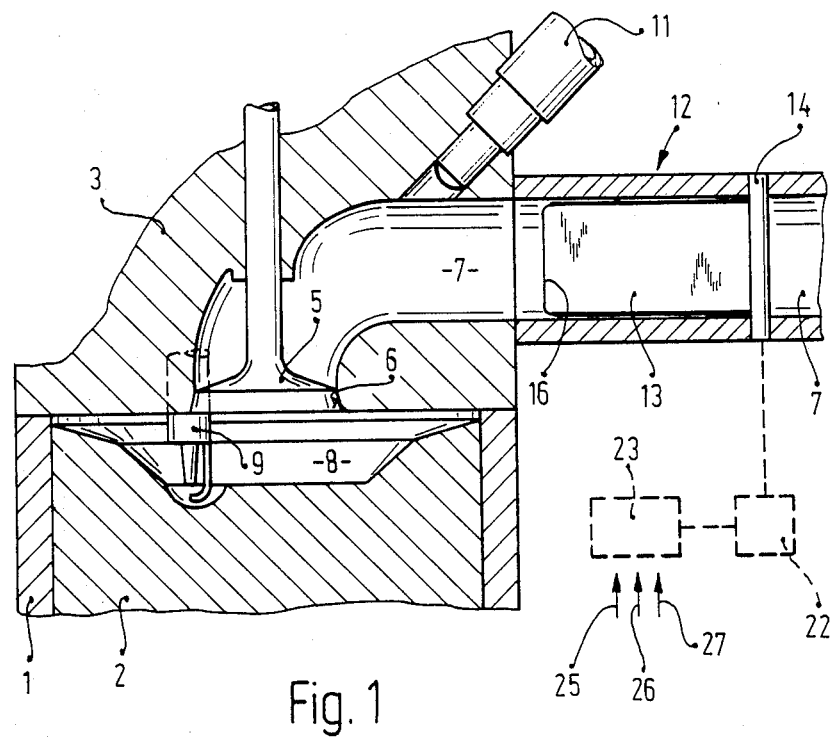
FIG. 1 is a partial sectional view of an internal combustion engine according to the invention.

The internal combustion engine shown in FIG. 1 comprises a cylinder 1 with a piston 2 slidably mounted therein. The cylinder 1 is limited on the other side by a cylinder head 3. An inlet valve 5 which cooperates with a valve seat 6 in the cylinder head 3 is slidably mounted in the cylinder head 3. The inlet valve 5 controls an inlet channel 7 to the cylinder 1. The end of the inlet channel 7 is represented, on the one hand, by the valve seat 6. Opposite the cylinder head 3 the piston comprises a stepped depression 8 into which projects a spark plug 9.

Figure 2:
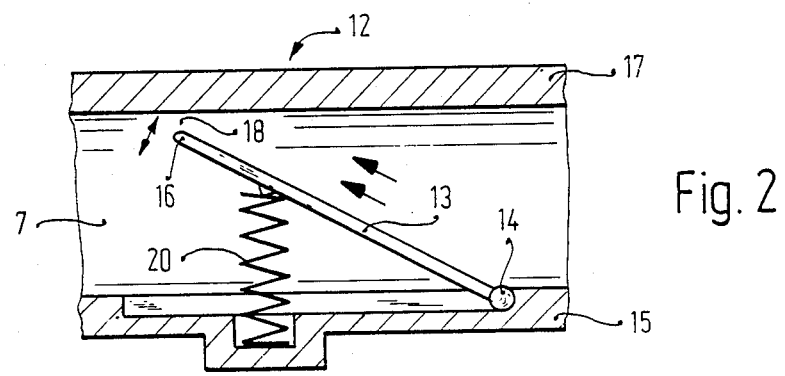
FIG. 2 is a partial view of the twist flap according to the invention.

Fuel may be injected into the inlet channel 7 in the direction of the inlet valve 5 as a function of the operating parameters of the engine by means of an injection valve 11 which is mounted, by way of example, on the cylinder head 3. Upstream of the injection valve 1 is an adjoining section 12 of the inlet channel 7. This section 12 has a rectangular cross-section and comprises therein an oscillatable flap 13 which serves as an operational member. The flap 13 also has a rectangular cross-section. As shown in FIG. 2, the flap 13 is pivotably mounted about a pivot axis 14 which is arranged on one wall 15 of the inlet channel section 12 in such a way that an air flow cross-section 18 can only be formed between the opposite end 16 of the flap 13 to the pivot axis 14 and the wall 17 of the section 12 opposite the wall 15.

In a first embodiment a spring 20, for example, a pressure spring, acts on the flap 13 in such a way that the end 16 of the flap 13 comes to rest against the wall 17 of the inlet channel section 12. This takes place in the absence of air flow. In the course thereof, the pressure spring 20 rests both on the flap 13 and on the wall 15. When the internal combustion engine is operating, the flap 13 is pivoted to a greater or lesser extent toward the wall 15 by the sucked-in air against the force of the spring 20, thereby clearing the air-flow cross-section 18. The characteristic frequency and damping of the flap 13 should be such that at a lower rpm it still partially follows the suction air surges but at a higher rpm it more or less stays still. The advantage of this is that when the engine is operating close to idling speed, reflux flows during the transition stages are throttled, thereby creating constant conditions for subsequent combustion(s). As a result, idling stability is improved and a very lean fuel-air mixture can be used. The essentially constant pressure drop at the flap 13 produces a constant oscillating effect as far as the cylinder 1 above the piston 2. This effect can be formed undisturbed horizontally in the depression 8 and can be maintained during the compression stage. As a result of the fuel being injected downstream of the flap 13 and of a reflux flow being avoided, there is formed in the cylinder 1, in the proximity of the piston 2, firstly a rich fuel-air mixture, and then subsequently, layers of ever weaker mixtures. The rotating, relatively rich fuel-air mixture can now be ignited by the spark plug 9 projecting into the depression 8 and combustion can spread to the weaker fuel-air mixture situated above it.

It is not desirable for an oscillating action to be produced during full load and thus the flap 13 is pivoted into a position in which it lies in a recess close to the wall 15 and thus exerts no influence on the flow.

In another embodiment, a servomotor 22, represented by the perforated lines, acts on the pivot axis 14 of the flap. The servomotor operates, for example, electromagnetically, and may be controlled by an electronic control device 23. The operating parameters of the internal combustion engine are supplied to the electronic control device 12 which forms a signal from these parameters and uses the signal to control the servomotor 22, which, in turn, causes the flap 13 to be pivoted accordingly. The parameter which is used primarily for the control function is the rpm 25 of the engine and secondarily the throttle valve position 26 is used to designate the full load position. The temperature 27 can also be used as another operating parameter.

The foregoing relates to a perferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An internal combustion engine comprising more than one cylinder (1), a piston (2) operative in each of said cylinders, a cylinder head (3) secured to each of said cylinders, a separate inlet channel (7) extending in said cylinder head to each of said cylinders, a separate fuel injection means for each of said cylinders inserted into said cylinder head having an outlet directed into said inlet channel for each of said cylinders for injecting fuel into said inlet channel, a separate adjoining section (12) upstream of said fuel injection means connected to each separate inlet channel (7) for each of said cylinders, each said separate adjoining section (12) for each said separate inlet channel provided with a wall (15) and having a flow area arranged to lead to said inlet channel, an inlet valve (5) for each separate cylinder for introducing a fuel-air mixture to said cylinder, a rectangular flap means (13) pivotably disposed in said flow area of each of said separate adjoining sections (12), pivot means (14) on said wall for said flap means, said flap means further provided with a terminal portion (16), and a spring (20) positioned within each respective adjoining section between said flap means (13) and said wall (15) which applies a closing force on said flap means within said separate adjoining section (12) which, dependent upon suction flow, said flap moves relative to said wall of said inlet channel.

2. An internal combustion engine as set forth in claim 1, in which each said adjoining section of each of said inlet channels includes a second wall directly opposite said wall, and said rectangular flap means extends from said pivot means on said wall to said second wall to close off said adjoining section to flow, and flow through each said inlet channel depends upon a spacing of said terminal portion of said flap means from said second wall of each adjoining section (12).

3. An internal combustion engine as claimed in claim 1 in which said flap is actuatable by a servomotor as a function of the operating parameters of said internal combustion engine.

4. An internal combustion engine as claimed in claim 1, in which said piston comprises means defining a depression which is adapted to receive a terminal portion of a spark plug.

5. An internal combustion engine as claimed in claim 1, in which said wall of each of adjoining sections of each of said inlet channels further includes a recess adapted to receive said flap means within said adjoining section.

6. An internal combustion engine as claimed in claim 5, in which said wall further includes a pocket, said pocket arranged to receive one end of said spring which engages said flap means.

7. An internal combustion engine as claimed in claim 1, in which said flap means is controlled by a servomotor.

8. An internal combustion engine as claimed in claim 7 in which said servomotor is controlled by an electronic control device as a function of the operating parameters of said internal combustion engine.

9. An internal combustion engine comprising more than one cylinder (1), a piston (2) operative in each of said cylinders, said piston includes means defining a depression which is adapted to receive a terminal portion of a spark plug, a cylinder head (3) secured to each of said cylinders, a separate fuel injection means for each of said cylinders inserted into said cylinder head having an outlet directed into said inlet channel for each of said cylinders for injecting fuel into said inlet channel, each of said inlet channels (7) including a separate adjoining section (12) upstream of said fuel injection means for each of said cylinders, each said separate adjoining section (12) for each said separate inlet channel provided with a wall (15) and having a flow area arranged to lead to said cylinder, an inlet valve (5) for each separate cylinder for introducing a fuel-air mixture to said cylinder, a rectangular flap means (13) pivotably disposed in said flow area of each of said separate adjoining sections (12), a spring (20) within said section (12) against which said flap means is actuatable counter to a force of said spring, pivot means (14) on each wall for said flap means, said flap means further provided with a terminal portion (16) which, dependent upon suction flow, moves relative to said wall of said inlet channel.

10. An internal combustion engine as claimed in claim 9, in which said flap is actuatable by a servomotor as a function of the operating parameters of said internal combustion engine.

11. An internal combustion engine as claimed in claim 9, in which said wall of said inlet channel further includes a recess adapted to receive said flap means.

12. An internal combustion engine as claimed in claim 9, in which said wall further includes a pocket, said pocket arranged to receive one end of said spring which engages said flap means.

13. An internal combustion engine as claimed in claim 12, in which said flap is actuatable by a servomotor as a function of the operating parameters of said internal combustion engine.

14. An internal combustion engine as claimed in claim 9, in which each said adjoining section (12) of each of said inlet channels (7) includes a second wall directly opposite said wall (15), and said rectangular flap means (13) extends from said pivot means on said wall (15) to said second wall to close off said adjoining section to flow, and flow through each said inlet channel (7) depends upon a spacing of said terminal portion of said flap means from said second wall of each adjoining section (12).

15. An internal combustion engine as claimed in claim 14, in which said flap is actuatable by a servomotor as a function of the operating parameters of said internal combustion engine.

16. An internal combustion engine comprising more than one cylinder (1), a piston (2) operative in each of said cylinders, a cylinder head (3) secured to each of said cylinders, a separate inlet channel (7) extending in said cylinder head to each of said cylinders, a separate fuel injection means for each of said cylinders inserted into said cylinder head having an outlet directed into said inlet channel for each of said cylinders for injecting fuel into said inlet channel, each of said inlet channels (7) including a separate adjoining section (12) upstream of said fuel injection means for each of said cylinders, each said separate adjoining section (12) for each said separate inlet channel provided with a wall (15) and having a flow area arranged to lead to said cylinder, an inlet valve (5) for each separate cylinder for introducing a fuel-air mixture to said cylinder, a rectangular flap means (13) pivotably disposed in said flow area of said separate adjoining sections (12), a spring (20) within said section (12) against which said flap means is actuatable counter to a force of said spring, pivot means (14) on each wall for said flap means, said flap means further provided with a terminal portion (16), and said flap means is controlled by a servomotor.

17. An internal combustion engine as claimed in claim 16, in which said flap is actuatable by said servomotor as a function of the operating parameters of said internal combustion engine.

18. An internal combustion engine as claimed in claim 16, in which said servomotor is controlled by an electronic control device as a function of the operating parameters of said internal combustion engine.

19. An internal combustion engine as claimed in claim 16, in which each said adjoining section (12) of each of said inlet channels (7) includes a second wall directly opposite said wall (15), and said rectangular flap means (13) extends from said pivot means on said wall (15) to said second wall to close off said adjoining section to flow, and flow through each said inlet channel (7) depends upon a spacing of said terminal portion (16) of said flap means from said second wall of each adjoining section (12).

20. An internal combustion engine as claimed in claim 19, in which said flap is actuatable by a servomotor as a function of the operating parameters of said internal combustion engine.

* * * * *